United States Patent [19]

Melman et al.

[11] 4,391,487
[45] Jul. 5, 1983

[54] OPTICAL FIBER CENTERING DEVICE

[75] Inventors: Paul Melman, Newton; W. John Carlsen, Boston, both of Mass.

[73] Assignee: GTE Laboratories Incorporated, Waltham, Mass.

[21] Appl. No.: 223,192

[22] Filed: Jan. 7, 1981

[51] Int. Cl.³ .............................................. G02B 5/14
[52] U.S. Cl. ............................................... 350/96.20
[58] Field of Search ........................... 350/96.2, 96.21

[56] References Cited

U.S. PATENT DOCUMENTS

| | | | |
|---|---|---|---|
| 4,181,401 | 1/1980 | Jensen | 350/96.2 |
| 4,201,443 | 5/1980 | Hodge | 350/96.2 |
| 4,257,674 | 3/1981 | Griffin et al. | 350/96.2 |

*Primary Examiner*—Eli Lieberman
*Attorney, Agent, or Firm*—Fred Fisher

[57] ABSTRACT

A centering device, for holding an optical fiber along an axis, includes three sections of fiber receiving means, and a receiving member. The receiving member has a cylindrical recess, concentric with the axis, for holding the sections in assembly. The sections are substantially identical, each having a uniform cross-sectional configuration at right angles along a major portion of its length forming a boundary of fixed perimeter. One portion of the boundary of one section contacts another section. Another portion of the boundary contacts a different section. A third portion contiguous to the first two portions is adapted to engage an optical fiber along its length. A fourth portion contiguous to the first two, but not to the third, engages the cylindrical wall defined by the concentric recess of the receiving member. The recess terminates with a planar wall perpendicular to the axis. It can have an axially oriented depression. The fourth portion of the boundary engages differing amounts of a cylindrical wall depending upon the shape of the fourth portion. The sections include elastomeric material of sufficient resilience for a passageway defined by the third portions of assembled sections to expandably receive an optical fiber dimensioned larger than the passageway. The passageway can have a substantially triangular cross-section for receiving a fiber having a substantially circular cross-section. It can flare outwardly from a position interior the fiber receiving means to respective ends thereof. Passageway flaring can have a triangular, a hexagonal, or a circular configuration. The device can have a fiber receiving means with a polygonal shaped external surface. The receiving member can be transparent. The fiber receiving means can be held within the recess of the member by a force fit. The radius of the three sections, when assembled but prior to insertion into the recess, is greater than the radius of the recess.

11 Claims, 7 Drawing Figures

OPTICAL FIBER CENTERING DEVICE

BACKGROUND OF THE INVENTION

1. Field of the Invention

This invention relates to optical fiber centering devices and, in particular, to such devices which provide alignment of an optical fiber with high accuracy so as to be suitable for use in numerous fiber coupling designs. Accordingly, it is a general object of this invention to provide new and improved devices of such character.

2. Description of the Prior Art

Various techniques were used in the past to center optical fibers. Such techniques, as known, utilized either (1) micromanipulators to initially align an optical fiber either manually or servomechanically before applying epoxy to fix the fiber in place; (2) precision machined holes, or ferrules, in conjunction with epoxying, soldering or crimping; or (3) watch jewels, often requiring several in tandem, followed by epoxying or crimping.

In the foregoing methods, highly accurate, usually expensive parts were required. Micromanipulators, however, could be used only in a laboratory environment or its equivalent. Human or servomechanical adjustment was required and the optical fiber had to be held precisely in place during the epoxy curing time. Machined metal parts used in some connectors required extreme machining accuracy and hence, were expensive to use. Machined holes and jewels had to be sufficiently large to accept all fiber diameters within a manufacturer's tolerance range, and, therefore, tended to be loose fits for most fibers.

3. Discussion of Other Art

In two copending United States patent applications, one by W. John Carlsen entitled "METHODS OF AND APPARATUS FOR CONNECTING OPTICAL FIBERS", Ser. No. 23,862, filed Mar. 26, 1979, now U.S. Pat. No. 4,325,607, issued Apr. 20, 1982, and the other by W. Griffin, W. John Carlsen and J. E. Benasutti entitled "ELASTOMERIC FIBER OPTIC SPLICE", Ser. No. 32,583, filed Apr. 23, 1979, now U.S. Pat. No. 4,257,674, issued Mar. 24, 1981, there are described fiber optic splices which were designed to precisely align automatically two fibers along the same axis so as to optimize power transfer between them. The instant invention, however, is intended to precisely align a single fiber automatically along an externally defined axis.

In a third copending United States patent application by W. John Carlsen entitled "OPTICAL FIBER CONNECTORS", Ser. No. 112,991, filed Jan. 17, 1980, there is described telecentric fiber optic connectors using plastic molded optics. Alignment is achieved by utilizing a variation of the splice configuration shown in the Ser. No. 23,862 application, wherein accuracy of the mold and molding process provide a precise centering.

SUMMARY OF THE INVENTION

Another object of this invention is to provide for new and improved devices to enable an optical fiber to be aligned with high accuracy.

Still another object of this invention is to provide a new and improved optical fiber centering device which can significantly improve the performance of a molded fiber optical connector.

Still yet another object of the invention is to provide for a new and improved optical fiber centering device for use in connection with fiber optic connectors and in packages for detectors, diode lasers and the like.

Yet another object of this invention is to provide for a new and improved optical fiber centering device which can precisely center an optical fiber along an axis of a cylindrical hole into which it has been inserted.

In accordance with a preferred embodiment of the invention, an optical fiber centering device includes fiber receiving means having three sections and a receiving member. The receiving member has an axial centrosymmetric surface of revolution with respect to a fixed axis. The member has a cylindrical, concentric axis therewithin for holding the sections in assembled relationship. The device is adapted to hold an optical fiber along its axis. In accordance with certain features of the invention, each of the three sections is substantially identical to each other. Each of the three sections has a uniform cross-sectional configuration at right angles along its length, forming a boundary of fixed perimeter. The boundary of one of the sections includes a first portion adapted to mate with a matable portion of the boundary of a second section. The boundary of one of the sections includes a second portion adapted to mate with a matable portion of the boundary of third section. The boundary of one of the sections includes a third portion contiguous to the first portion and the second portion for engaging an optical fiber along the length. The boundary of one of the sections includes a fourth portion contiguous to the first and second portions, but not to the third portion, for engaging the cylindrical wall defined by the concentric recess. In accordance with other features of the invention, the recess terminates with a planar wall perpendicular to the axis and it can terminate with a planar wall having a depression therewithin axially oriented with respect to the axis. The fourth portion can engage the cylindrical wall along differing percentages thereof, depending upon the shape of the fourth portion. With other features, the sections comprise an elastomeric material of sufficient resilience to permit a passageway defined by the third portions of the assembled sections to expandably receive an optical fiber dimensioned larger than the passageway. The passageway can have a substantially triangular cross-section for receiving a fiber having a substantially circular cross-section. The passageway can flare outwardly from a position interior the fiber receiving means to respective ends thereof.

In accordance with certain features of the invention, the flaring of the passageway can have a triangular configuration, a hexagonal configuration, or a circular configuration. The fiber receiving means can have an external surface of polygonal shape. The receiving member can comprise a transparent material, and the fiber receiving means can be held within the recess of the member by a force fit. The radius of the three sections, when assembled, but prior to insertion in the recess, is preferably greater than the radius of the recess.

BRIEF DESCRIPTION OF THE DRAWINGS

Other objects, advantages and features of this invention, together with its construction and mode of operation, will become more apparent from the following description, when read in conjunction with accompanying drawing, in which.

DESCRIPTION OF PREFERRED EMBODIMENTS

Figure 1:
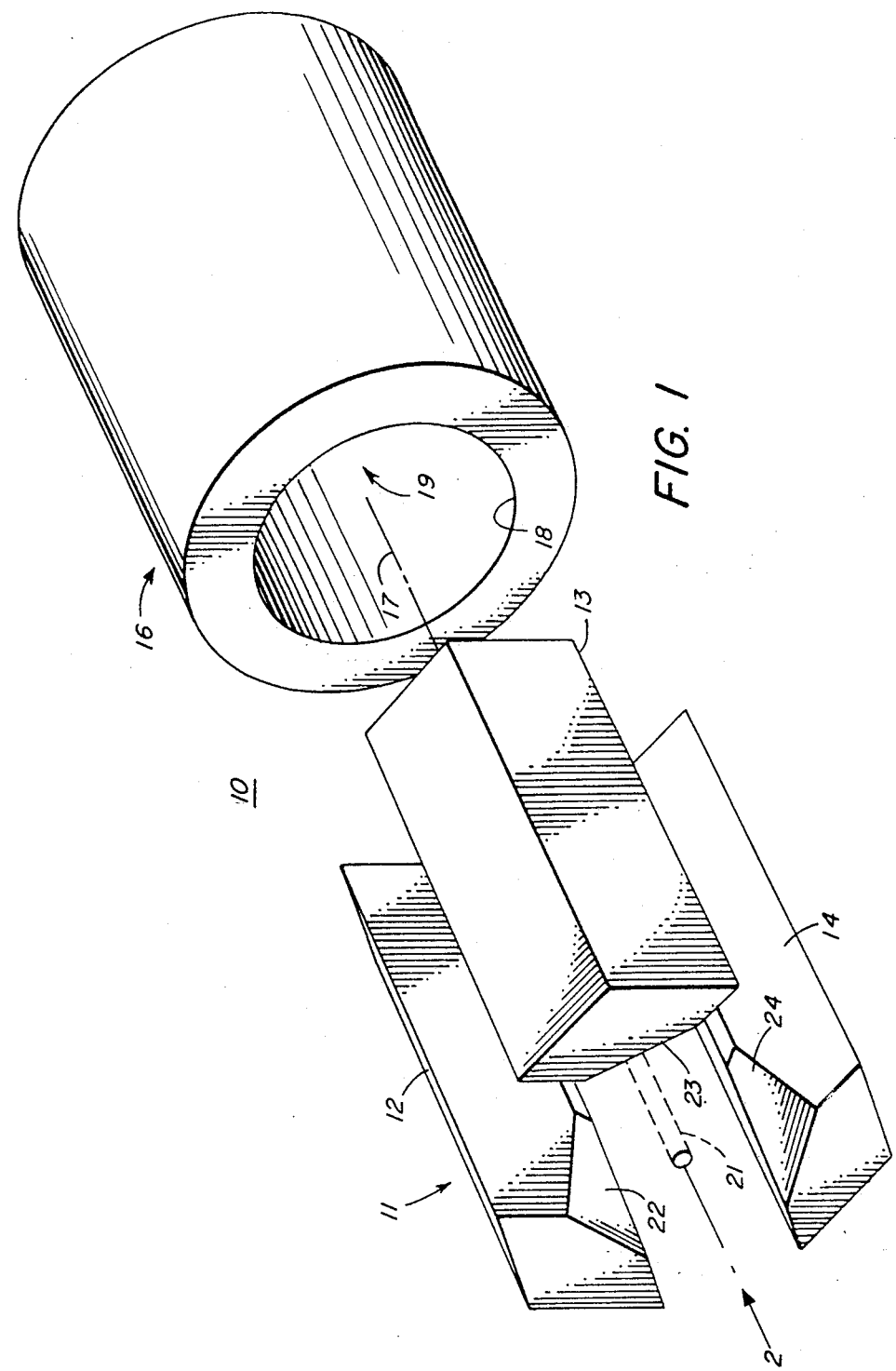
FIG. 1 is an exploded perspective view of one embodiment of this invention illustrating an optical fiber centering device, with an optical fiber illustrated in dotted line format.
Figure 3A:
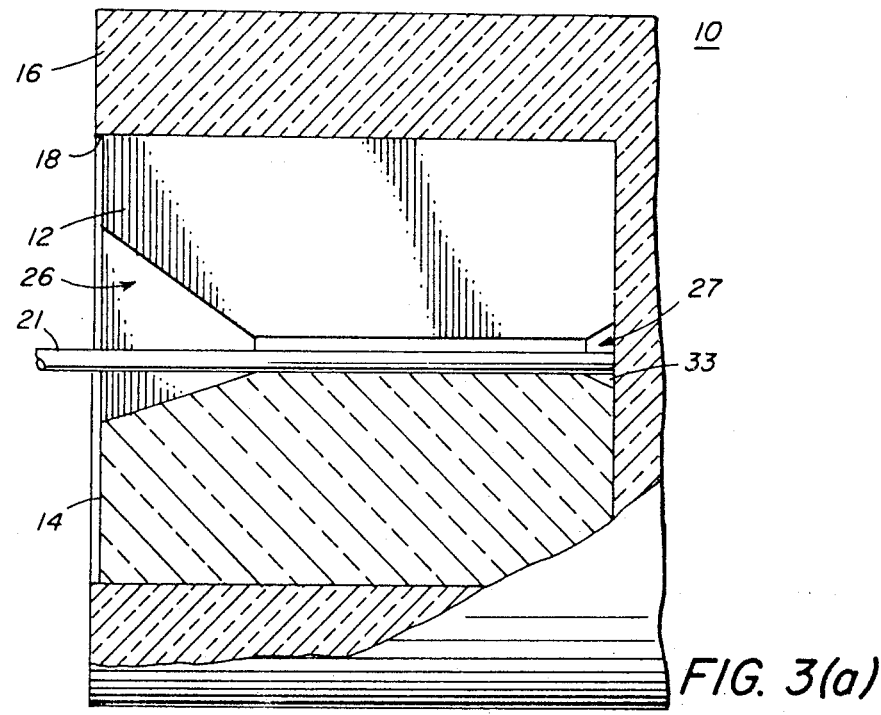
FIG. 3A is a sectional view of one embodiment of the invention taken along the line 3(a)—3(a) of FIG. 2.
Figure 2:
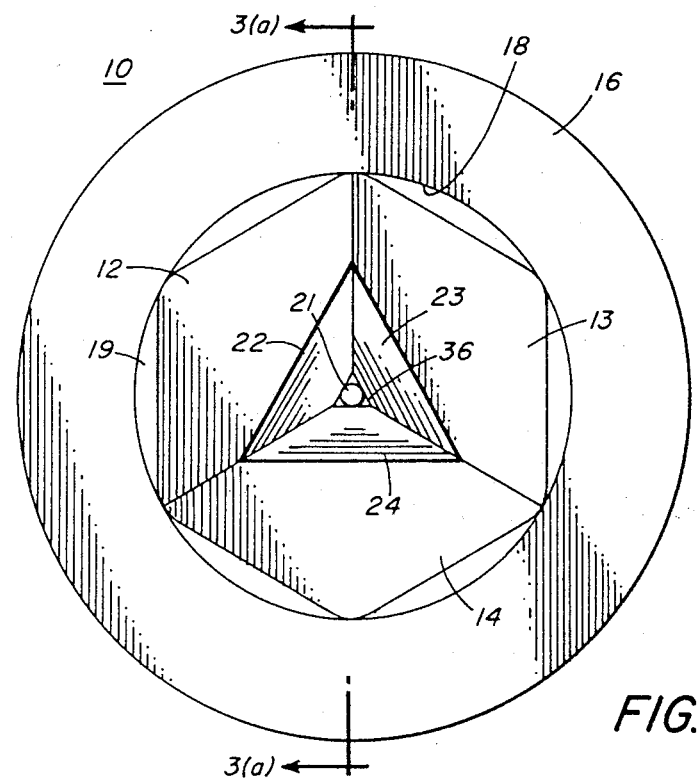
FIG. 2 is a front view of an assembled device shown in FIG. 1, viewed along the line —2— thereof.

Referring to the drawing in connection with one embodiment of the invention, FIG. 1 depicts an exploded view, FIG. 2 is a view taken along the direction —2— of FIG. 1, and FIG. 3A depicts a sectional view taken along the line 3(a)—3(a) of FIG. 2. The embodiment, as depicted in these views, includes an optical fiber centering device 10. The centering device 10 includes fiber receiving means 11 having three identical sections 12, 13, and 14.

The optical fiber centering device 10 further includes a receiving member 16. The receiving member has a central fixed axis 17 and has an internal surface defined as an axial centrosymmetric surface of revolution 18 with respect to the fixed axis 17; that is, the internal surface of revolution 18 is symmetric with respect to the central axis 17.

The receiving member 16 further contains a cylindrical, concentric recess 19 therewithin for holding the three sections 12, 13, and 14 in assembled relationship. By so doing, the optical fiber centering device 10 is enabled to hold an optical fiber 21 along the axis 17.

The three sections 12, 13, and 14 are substantially identical since, preferably, they each have been molded by the same mold to ensure their mutual identity. As the three sections 12, 13, and 14 are, in unison, a multiple elastomeric insert by virtue of elasticity, it precisely centers the optical fiber 21 along the axis 17 of the cyindrical recess 19 into which it has been inserted.

The sections 12, 13, and 14 are provided with tapers 22, 23, and 24 to form a triangular shaped flared taper 26, as best viewed in FIG. 3A. An external taper 27 can be provided, if desired. The major portion of the fiber receiving means 11, however, does not contain either the taper 26 or the taper 27.

Figure 5:
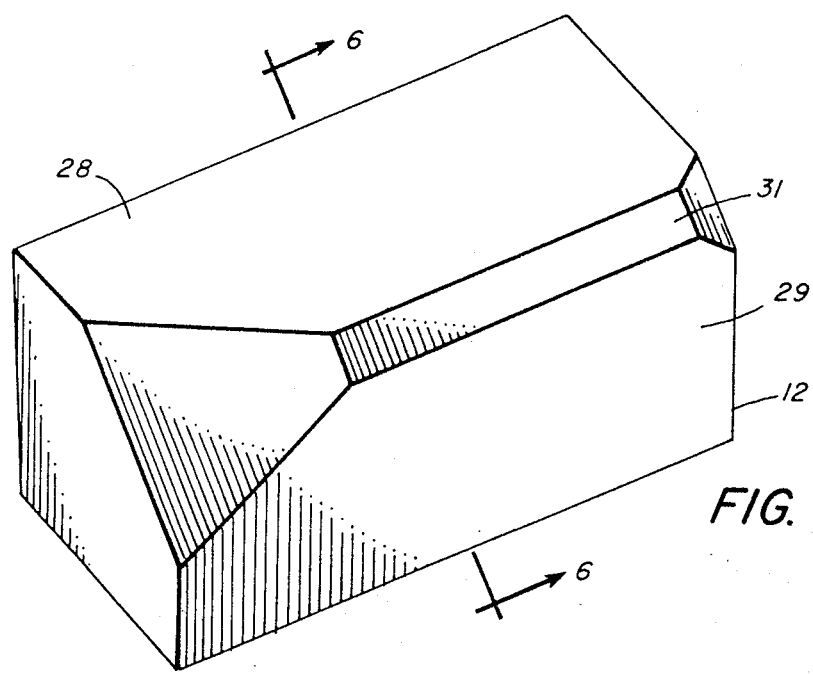
FIG. 5 is a perspective view of a section of a fiber receiving means shown in combination in FIGS. 1-4.
Figure 6:
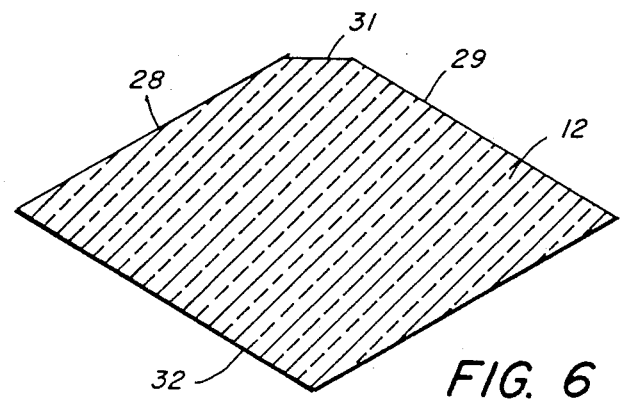
FIG. 6 is a view taken along the line 6—6 of FIG. 5.

FIG. 5 depicts a perspective view of one section 12, and FIG. 6 shows a sectional view of the section shown in FIG. 5 taken along the line 6—6 thereof. Each of the sections 12, 13, and 14 has a uniform cross-sectional configuration at right angles along a major portion of its length, forming a boundary of fixed perimeter as best shown in FIG. 6. The section 12, as shown in FIG. 6, includes a first portion 28 which is adapted to mate with a matable portion of the boundary of a second section, such as section 13, for example. The boundary of the section 12 includes a second portion 29 which is adapted to mate with a matable portion of the boundary of a third section, for example, section 14. The boundary of the section 12 includes a third portion 31 contiguous to the first portion 28 and the second portion 29 for engaging an optical fiber 21 along the length of the section 12. The boundary of the section 12 further includes a fourth portion 32 contiguous to the first portion 28 and the second portion 29, but not to the third portion 31, for engaging the cylindrical wall defined by the concentric recess 19.

The recess 19 terminates with a planar wall 33 perpendicular to the axis 17.

Figure 3B:
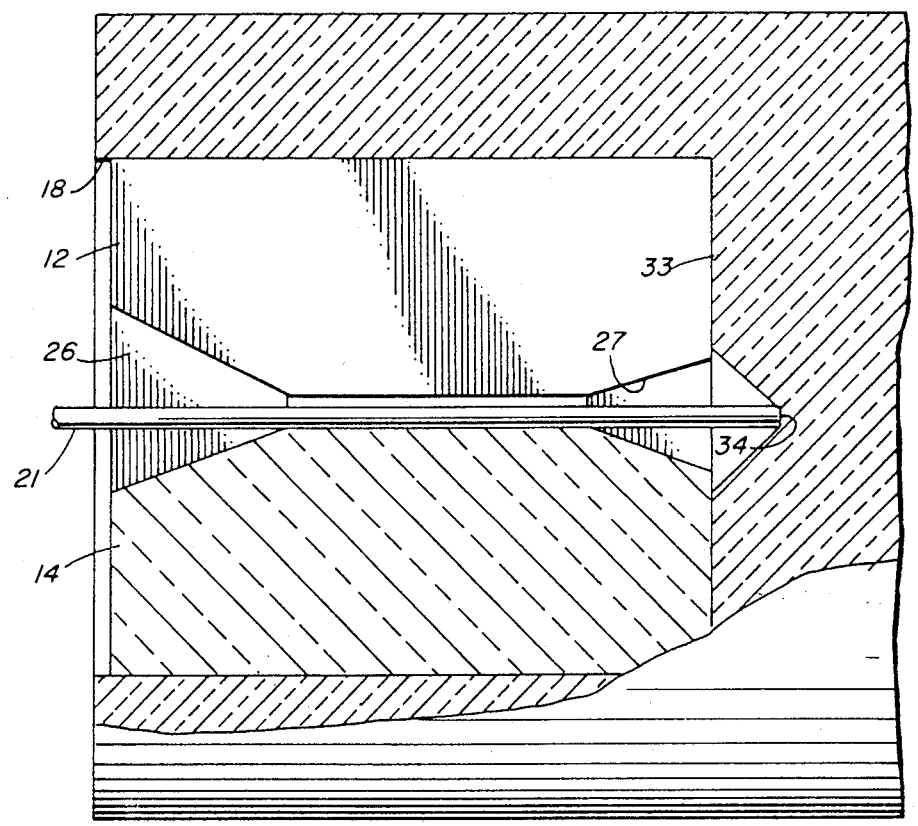
FIG. 3B is a sectional view of another embodiment of the invention taken along the line 3(a)—3(a) of FIG. 2.

Another embodiment is depicted in FIG. 3B which should be viewed jointly with FIG. 1 and FIG. 2. FIG. 3B is similar to FIG. 3A with the planar wall 33 further containing a depression 34 therewithin axially oriented with respect to the axis 17.

The fourth portion 32 of the section 12, and corresponding portions of the sections 13 and 14, each engage the cylindrical wall of the receiving member 16 along less than fifty percent of its portion. The size of the sections 12, 13, and 14 is such that they are larger than the recess 19, when assembled but prior to insertion thereinto. In similar respect, the sections 12, 13, and 14 comprise elastomeric material of sufficient resilience to permit a passageway 36 defined by the third portions 31 of the assembled sections 12, 13, and 14 to expandably receive an optical fiber 21 dimensioned larger than the passageway 36.

The passageway 36 can have a substantially triangular cross-section, as shown in FIG. 2, for receiving an optical fiber 21 having a substantially circular cross-section.

As depicted in FIG. 3A, the passgeway 36 flares outwardly from a position interior the fiber receiving means 11 to respective ends thereof. The flaring of the passageway, as viewed in FIG. 1 and FIG. 2, can be of triangular configuration. Alternatively, circular configurations and hexagonal configurations are acceptable. The fiber receiving means 11, when assembled, but prior to insertion within the receiving member 16, has an external surface of polygonal shape, preferably hexagonal. The receiving member 16 can be of a transparent material and can hold the fiber receiving means 11 by way of a forced fit. The radius of the three sections 12, 13, and 14, when assembled but prior to insertion in the recess 19, is greater than the radius of the recess 19.

The axis 17, along which an optical fiber 21 is to be aligned in a connector or other component, is defined as the axis 17 of the cylindrical shaped hole 19 of the outer rigid housing 16 into which the centering device 11 is inserted, as indicated in FIG. 1. Furthermore, the desired position of the end of the fiber 21, along the axis 17, is normally defined by a surface along a planar wall 33 at the end of the cylindrical hole 19. The fiber 21 is simply pushed through the centering device 11 until it is stopped by, and abuts, the end surface of the planar wall 33. The end surface can be, as for example: 1. a focal plane surface of the molded telecentric connector or related connector design set forth in the copending application by Carlsen, "Optical Fiber Connectors", Ser. No. 112,991, filed Jan. 17, 1980, 2. a surface of a light detector, such as a photodiode, 3. an output surface or window of a light source, such as a light-emitting diode, or 4. an output window of a hermetically sealed package containing an atmosphere sensitive light source, such as a diode laser, whose protected emitting surface is imaged by a lens onto an outside surface of the window at a point where the fiber abuts.

The optical fiber centering device 10, preferably, is made of a moderately soft elastomer. When the three sections 12, 13, and 14 of the fiber receiving means 11 are assembled, as shown in FIG. 2, the outer surface is in a shape of a hexagonal prism whose geometrical size is slightly too large to fit into the cylindrical hole 19 of the receiving member 16 without distortion. Because of its elasticity, however, the six points of the hexagon can compress sufficiently to allow the device 11 to be inserted into the hole 19 with a small amount of force and to remain there without the addition of adhesives. Due to the symmetric shapes of the hole 19 and of the insert 11 about their respective axes, and also because of the identical shapes of the three sections 12, 13, and 14 of the fiber receiving means 11 relative to its axis, the elastic restoring forces of the compressed insert material tend to position the insert 11 symmetrically about the axis 17 of the cylindrical receiving member 16. In particular, the triangular hole 36 at the center of the insert 11 automatically centers about the axis 17 of the cylindrical hole 19.

Due to the symmetry of the fiber receiving means 11 and its elasticity, the size thereof is not critical relative to the diameter of the cylindrical hole 19. Such characteristic is important, as in most precision molding operations many parameters are involved which cannot be completely controlled and replicated from run to run, thereby resulting in up to several percent variations of material shrinkage. The one critical dimension, the size of the central triangular hole into which a fiber 21 is to be inserted (actually, the length of one side of that triangle as defined by one of the surfaces on the three identical molded parts 12, 13, and 14) is relatively insensitive to run-to-run shrinkage variations. Although its absolute dimensions are very small (approximately 190 micrometers for a 125 micrometer diameter fiber), once it is achieved from the mold, a few percent variation is not significant to its proper operation.

The triangular cross-sectional central hole 36, once formed and automatically centered in the cylindrical hole 19, functions very much like the triangular hole in the copending United States patent application by Griffin, Carlsen and Benasutti entitled "ELASTOMERIC FIBER OPTIC SPLICE", Ser. No. 32,583, filed Apr. 23, 1979, not U.S. Pat. No. 4,257,674, issued Mar. 24, 1981. The size of the triangle is such that a circle geometrically inscribed within it is slightly smaller than the circular cross-section of the fiber 21 to be inserted into it. It has been found that an inscribed circle with a diameter of approximately 110 micrometers is suitable for a 125 micrometer diameter fiber when using several elastomer materials with a "Shore A" hardness of approximately 90, the exact optimal size being determined experimentally for a given material.

The elastic walls of the triangular hole 36, therefore, are deformed by the insertion of the fiber 21. The elastic restoring forces of the compressed material, because of the symmetry, tend to position the fiber 21 to where the three forces are equal, that is, such that the axes of the fiber 21 and of the original triangular hole 36 are along the same line. In particular, the fiber 21 is automatically centered along the axis 17 of the cylindrical hole 19 into which the centering device 11 has been inserted. As shown in the drawing, the entrance of the assembled centering device 11 is tapered out to many times the central triangular hole size, thus making it easy to "thread" the fiber 21 onto the device 11 by hand without the use of magnifying optics. Although the cross-section of the taper can be made triangular like the shape of the hole it is tapering into, as shown in the drawing, this is not optimal as it reduces the achievable effective "threading" hole size for a given size insert. A circular cross-section (not shown) is optimal, but is difficult to manufacture. A hexagonal cross-section is believed to be easier to fabricate by way of a compromise shape.

Primarily, as set forth above, it has been assumed that the end surface of the cylindrical hole 19 is simply a plane surface 33 into which the fiber 21 abuts, leaving the centering of the fiber 21 to the centering unit 11. This indeed is the case in most applications of the centering device 11. There are, however, some cases where the fiber 21 must be precisely positioned to a particular point which might not be as precisely located on the axis 17 of the cylindrical hole 19. There are also cases where it is important to achieve a precise alignment, even when the desired location is on the axis 17, that an automatic backup final alignment mechanism is desired to insure against small, undetected defects in the molded parts of the centering insert 11. Examples of such cases are: 1. the plastic molded telecentric connector, as set forth in the United States patent application, Ser. No. 112,991, for which it is extremely difficult for a moldmaker to center the relatively large cylindrical hole along the lens optical axis to within several microns, but much easier to locate a smaller detailed structure to that accuracy, or 2. a semiconductor device, such as a Burrus-type light-emitting diode, that cannot be fabricated integral to the cylindrical alignment hole, and which cannot be accurately positioned in the same place on the chip from batch to batch.

Figure 4:
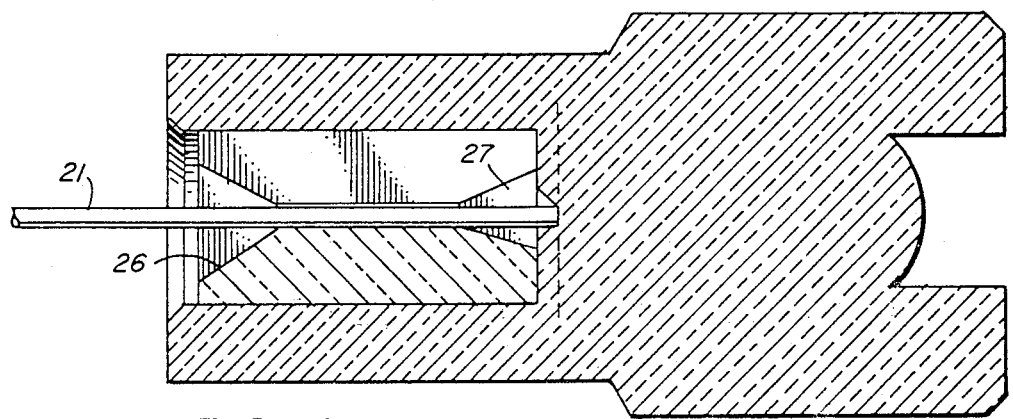
FIG. 4 is a view, similar to that of FIG. 3B, as applied to a telecentric optical connector.

FIG. 3B illustrates generally how that can be achieved, and FIG. 4 illustrates how this can be performed using a molded telecentric connector as an example. There are two differences from the previous case depicted in FIG. 3A. FIGS. 3B and 4 show an enlarged taper at the internal end of the insert 11. Such taper permits the fiber 21, after having been accurately aligned at or close to the axis 17 of the cylindrical hole 19, to be moved laterally a small amount at the end without significantly changing its angular orientation. As indicated, the two tapers need not have the same size and shape. The embodiment 11 depicted in FIG. 3A may or may not have the internal taper. It is not necessary. However, for uniformity of parts and for cost, it may be desirable to have the same type insert 11, whether it is to be used in a receiving member 16 that has a planar surface, or whether it is to be used in a receiving member that has depression therewithin.

The second difference is the depression or indentation shown on the internal end surface of the cylindrical hole 19, such an indentation or depression can be performed by a variety of methods, depending upon the application. In the case of a molded connector, as depicted in FIG. 4, the indentation would simply be molded in the end of the hole in the connector, having been accurately positioned on the optical axis 17 of the molded lens. However, in the case of the light-emitting diode, the indentation can be an etched structure on the chip itself. In any event, when the fiber 21 is inserted through the centering device 11, and pushed to the end surface, if the fiber approaches slightly off from the center of the indentation, the conical side walls of the indentation will automatically guide the fiber end to its center, abutting the flat surface at its end.

In most cases, it is desirable to use any of various materials, such as refractive index matching fluid, epoxy, optical coupling gel, and adhesive between the fiber 21 end and the end surface 33 or depression 34 of the cylindrical hole 19, inside the triangular hole 36 surrounding the fiber 21, in the entrance taper 26, the exit taper 27, or any combination of these. An index matching material, whether fluid, gel, epoxy, adhesive, or other has a desired function of eliminating or greatly reducing reflection losses at the fiber end and the surface to which it abuts, it being noted that the abutment is generally not a perfect optical contact and, generally, has a small air gap, unless filled with an index matching material. Epoxies and adhesives, wherever used, hold the fiber 21 in place permanently. Most of these materials tend to lubricate the surfaces of the triangular hole 36 to make insertion of the fiber 21 easier, thus allowing a smaller sized triangular hole to be used for greater elastic aligning power.

The foregoing invention has various advantages over prior art devices. In large quantities, the centering device 11 inserts are very inexpensive as they can be made by high speed production methods such as injection molding. Because the three sections 12, 13, and 14 are identical, having come from the same mold and the same mold run, the symmetry of the resulting device 11 provides automatic centering 21 even when the manufacturing mold is slightly imperfect or when the molding conditions yield a slightly different sized part for a given molding run.

A fiber 21 is easily inserted into the central aligning hole 36 because of the large entrance hole 26. Because the tapered sides are soft and resilient, neither the fiber 21 nor the insert 11 is damaged by unsteady hands of an operator. Thus, the insertion of the fiber 21 can be performed without magnifiers or special tools. Furthermore, once the fiber 21 is in place, it remains there, because of the holding action of the stretched elastic walls of the triangular hole 36. One does not have to wait for the curing of the epoxy, for example, before releasing the fiber 21, nor is a separate action, such as crimping, required to accomplish the holding effect. Most fluid, epoxies, and the like that have been used in the triangular hole 36 have lubricated the fiber wall interface sufficiently to make insertion and removal easy when actively pushing or pulling on the fiber by hand, but not sufficiently to allow the fiber 21 to slip out on its own when not under external tension. When epoxy or other adhesive is used, therefore, the working device generally can immediately be set aside to cure on its own, while the operator leaves or goes on to the next device.

Furthermore, with the embodiment depicted in FIGS. 3B and 4, the indentation at the end of the cylindrical hole 19 provides an alignment accuracy which has not been previously available.

Various alternative constructions have been set forth above. It is emphasized, however, that details of the geometrical shape of the device are not critical to its operation as long as central axis symmetry is maintained. For example, the hexagonal outer cross-section can be any other regular polygon, if desired for a given application. It can be circular, though the tolerances for fitting snugly into the cylindrical hole become much tighter. The shape of the taper 26 can be of any generally smooth design. The shape of the central hole 36 is optimal when it contacts the fiber at only three symmetrical places. The triangular shape described is only one such shape. In lieu of a flat portion 31, as shown in FIG. 6, the portion 31 could be curved. Other regular polygons are acceptable for certain materials and dimensions. A circular shaped hole is within the scope of the invention, although a circular shaped hole does not provide a relief space for air or epoxy, etc. as the fiber 21 is inserted.

The principles of the instant invention provide for an automatic self-aligning device for accepting, centering and holding a fiber 21 along a predetermined axis 17 and at a predetermined position along that axis. Furthermore, the concept of utilizing three identical molded elastic sections 12, 13, and 14 to make a device which is highly symmetric, both inside and outside, so that the device 11 is easily inserted into a cylindrical hole 19 where it automatically and precisely centers itself and so that a fiber 21 is easily inserted into its central hole 19 where it is automatically and precisely centered on the axis 17 of the cylindrical hole 19 is believed to be highly advantageous.

Furthermore, the concept of utilizing such a device in conjunction with a backup or final positioning device, that is, the tapered indentation, as depicted in FIGS. 3B and 4, for ensuring that the end of the fiber is positioned to a highly specific position, either centered or slightly offset from the axis, is believed to have high desirability.

Other modifications will suggest themselves to those skilled in the art.

What is claimed is:

1. An optical fiber centering device comprising
(a) fiber receiving means having three sections, wherein each of said three sections is substantially identical to each other, and wherein each of said sections has a uniform cross-sectional configuration at right angles along a major portion of its length forming a boundary of fixed perimeter, and
(b) a receiving member having an axial centrosymmetric surface of revolution with respect to a fixed axis, said member having a cylindrical, concentric recess therewithin for holding said sections in assembled relationship, wherein said boundary of one of said sections includes a first portion adapted to mate with a matable portion of said boundary of a second of said sections, said boundary of said one of said sections includes a second portion adapted to mate with a matable portion of said boundary of a third of said sections, said boundary of said one of said sections includes a third portion contiguous to said first portion and said second portion for engaging an optical fiber along said length, and said boundary of said one of said sections includes a fourth portion contiguous to said first portion and said second portion but not to said third portion for engaging the cylindrical wall defined by said concentric recess, wherein said recess terminates with a planar wall perpendicular to said axis, and wherein said fourth portion engages said cylindrical wall along a fraction of said fourth portion,
said device being adapted to hold an optical fiber along said axis.

2. The device as recited in claim 1 wherein said planar wall has a depression therewithin axially oriented with respect to said axis.

3. The device as recited in claim 1 wherein said sections comprise an elastomeric material of sufficient resilience to permit a passageway defined by said third portions of assembled sections to expandably receive an optical fiber dimensioned larger than said passageway.

4. The device as recited in claim 3 wherein said passageway has a substantially triangular cross-section for receiving a fiber having a substantially circular cross-section.

5. The device as recited in claim 4 wherein said passageway flares outwardly from a position interior the fiber receiving means to respective ends thereof.

6. The device as recited in claim 5 wherein the flaring of said passageway has a triangular configuration.

7. The device as recited in claim 5 wherein the flaring of said passageway has a hexagonal configuration.

8. The device as recited in claim 5 wherein the flaring of said passageway has a circular configuration.

9. The device as recited in claim 5 wherein said fiber receiving means has an external surface of polygonal shape.

10. The device as recited in claim 5 wherein said receiving member comprises a transparent material.

11. The device as recited in claim 1 wherein said fiber receiving means is held within said recess of said member by a force fit, and wherein a radius of said three sections when assembled but prior to insertion in said recess is greater than a radius of said recess.

* * * * *